(12) United States Patent
Wan

(10) Patent No.: US 12,467,620 B2
(45) Date of Patent: Nov. 11, 2025

(54) DOWNWARD MOBILE GASIFICATION BOILER FOR SURFACE GAS PHASE COMBUSTION AND PYROLYSIS OF BIOMASS BRIQUETTE

(71) Applicant: HEILONGJIANG ZHONGTAN JIAHE BIOMASS TE CHNOLOGY RESEARCH AND DEVELOPMENT CO., LTD, suihua (CN)

(72) Inventor: Xianjun Wan, suihua (CN)

(73) Assignee: HEILONGJIANG ZHONGTAN JIAHE BIOMASS TECHNOLOGY RESEARCH AND DEVELOPMENT CO., Suihua (CN)

( * ) Notice: Subject to any disclaimer, the term of this patent is extended or adjusted under 35 U.S.C. 154(b) by 394 days.

(21) Appl. No.: 18/105,254

(22) Filed: Feb. 3, 2023

(65) Prior Publication Data
US 2023/0184424 A1 Jun. 15, 2023

Related U.S. Application Data

(63) Continuation of application No. PCT/CN2022/117996, filed on Sep. 9, 2022.

(51) Int. Cl.
F23B 90/06 (2011.01)
F22B 7/12 (2006.01)
(Continued)

(52) U.S. Cl.
CPC ............... *F22B 7/12* (2013.01); *F23B 90/06* (2013.01); *F23H 13/08* (2013.01); *F23N 3/045* (2013.01)

(58) Field of Classification Search
CPC .. F22B 7/12; F23B 90/06; F23H 13/08; F23N 3/045; F24H 15/235; F24H 15/305;
(Continued)

(56) References Cited

U.S. PATENT DOCUMENTS 5,026,403 A * 6/1991 Michel-Kim ............ C10J 3/721
48/209
8,252,072 B2 * 8/2012 Dogru ........................ C10J 3/30
48/77
(Continued)

FOREIGN PATENT DOCUMENTS

CN 102777890 A * 11/2012
CN 206803479 U * 12/2017
(Continued)

*Primary Examiner* — Gregory A Wilson
(74) *Attorney, Agent, or Firm* — Hemisphere Law, PLLC; Zhigang Ma

(57) ABSTRACT

A downward mobile gasification boiler for surface gas-phase combustion and pyrolysis of biomass briquette is provided. The boiler includes a gasification combustion chamber, a gas combustion chamber, a stranding cage slag remover, a heat exchanger, a water jacket, an air duct and an air distribution system. The air duct connected with the air distribution system is arranged in the inner cavity of the wall surface of the gasification combustion chamber. The gas combustion chamber is arranged at the upper part of the gasification combustion chamber, and an air outlet is arranged in the middle to communicate the gas combustion chamber with the gasification combustion chamber. The lower part of a port of the gasification combustion chamber is provided with a twisting cage slag remover.

10 Claims, 2 Drawing Sheets

(51) Int. Cl.
*F23H 13/08* (2006.01)
*F23N 3/04* (2006.01)

(58) Field of Classification Search
CPC ........ F24H 8/00; F24H 9/0005; F24H 9/1845;
F24H 9/2057; C10J 3/482; C10J 2200/09;
C10J 3/20
See application file for complete search history.

(56) References Cited

U.S. PATENT DOCUMENTS

| | | | |
|---|---|---|---|
| 8,640,655 B2 * | 2/2014 | Furman | F23M 7/00 |
| | | | 110/158 |
| 2016/0298040 A1 | 10/2016 | Chen | |
| 2018/0195015 A1 | 7/2018 | Ma et al. | |
| 2020/0231885 A1 | 7/2020 | Zhang | |
| 2023/0184424 A1 * | 6/2023 | Wan | F23L 9/02 |
| | | | 122/2 |

FOREIGN PATENT DOCUMENTS

| | | | | | |
|---|---|---|---|---|---|
| CN | 206875702 | U | * | 1/2018 | |
| CN | 105368497 | B | * | 7/2018 | |
| CN | 113566416 | A | * | 10/2021 | |
| EP | 3789685 | A1 | * | 3/2021 | ........... B01D 53/002 |
| WO | WO-2005047435 | A2 | * | 5/2005 | ................ C10J 3/22 |
| WO | WO-2012171317 | A2 | * | 12/2012 | ................ F23C 6/02 |

\* cited by examiner

DOWNWARD MOBILE GASIFICATION BOILER FOR SURFACE GAS PHASE COMBUSTION AND PYROLYSIS OF BIOMASS BRIQUETTE

CROSS-REFERENCE TO RELATED APPLICATIONS

This patent application is a continuation application of PCT/CN2022/117996, filed on Sep. 9, 2022, which claims the benefit and priority of Chinese Patent Application No. 202210837281.0, filed on Jul. 15, 2022, the disclosure of which is incorporated by reference herein in its entirety as part of the present application.

TECHNICAL FIELD

The invention relates to the technical field of gasification and combustion of biomass briquettes, in particular to a downward mobile gasification boiler for surface gas-phase combustion and pyrolysis of biomass briquettes.

BACKGROUND

China is a large agricultural country with an annual output of about 800 million tons of crop straw, ranking first in the world. Currently, the main uses of straw in China are papermaking, feed, rural domestic energy (as fuel), and some of it is used to return to the field to make fertilizer, while the rest of the straw is abandoned or burned. A large amount of smoke from incineration has not only become a bottleneck in rural environmental protection, but also a bottleneck in rural environmental protection. It has even become the chief culprit of the urban environment.

With the development of economy, facing the increasingly depleted fossil energy and the increasingly serious environmental problems, renewable and storable biomass energy has gained national attention. The crop straw has high storage and transportation cost and low utilization efficiency and cannot be used on a large scale, because of its low density, wide distribution, large fluctuations in moisture content and other characteristics. However, the biomass briquette fuel has the characteristics of low moisture content, high density, low storage and transportation cost, smooth surface and small internal friction, which increases the fluidity and permeability of biomass and provides conditions for the design of fixed bed gasification boilers below 10 MW.

The existing biomass briquette gasification boiler has many problems, such as unreasonable structure, insufficient and incomplete fuel combustion, high fixed carbon content in the discharged ash, low combustion efficiency, excessive nitride emission, complicated smoke net profit process, easy explosion of combustible gas in the hearth, potential safety hazards and the like.

Therefore, how to optimize the structural design of the gasification boiler and optimize the biomass briquette gasification combustion process, improve the fuel gasification combustion efficiency, and reduce smoke emissions has become an urgent problem to be solved by those skilled in the art.

SUMMARY

In view of this, the disclosure provides a downward mobile gasification boiler for surface gas-phase combustion and pyrolysis of a biomass briquette, so as to effectively solve the above problems in the prior art. The specific technical scheme is as follows:

A downward mobile gasification boiler for surface gas-phase combustion and pyrolysis of a biomass briquette including a gasification combustion chamber, a fuel gas combustion chamber, a stranding cage slag remove, a heat exchanger, a water jacket, an air duct and an air distribution system is provided. The lower side surface of the gasification combustion chamber is provided with a gasification combustion chamber sealing door, the upper side surface of the gasified combustion chamber is provided with a sealed feeding door, And that seal door of the gasification combustion chamber and the feed door are positioned on different sides of the gasification combustion chamber. The bottom of the inner cavity of the gasification combustion chamber is provided with a downward through opening, the bottom end of the through opening is connected with an inlet of the stranding cage slag remover which is positioned at the lower part of the gasification combustion chamber, a slag removing port of the stranding cage slag remover is communicated with the outside of a boiler, and a sealing door for the slag removing port is arranged at the slag removing port. The top of, an inner cavity of the gasification combustion chamber is connected with an air outlet, the upper end of the air outlet is communicated with an air chamber, the air chamber consists of an outer sleeve and an inner sleeve, the outer sleeve is provided with an outer sleeve air inlet, and the side peripheral wall of the inner sleeve is uniformly provided with a plurality of air outlets; The upper end of the inner sleeve is communicated with the gas combustion chamber positioned at the upper part of the gasification combustion chamber, the side surface of the gas combustion chamber is provided with a gas combustion chamber sealing door, and in addition, the sealing door of the gas combustor and the sealing door of the gasification combustion chamber are positioned at the same side. The heat exchanger is integrally arranged on the sides of the gasification combustion chamber and the gas combustion chamber, and one side of the gas combustion chamber close to the heat exchanger is communicated with the heat exchanger through a smoke outlet; The periphery of the gasification combustion chamber, the gas combustion chamber and the heat exchanger is integrally provided with the water jacket, and the water jacket is communicated with an outer net;

The inner cavity of the wall surface of the gasification combustion chamber is internally provided with five air ducts which are a first air duct, a second air duct, a third air duct, a fourth air duct and a fifth air duct respectively, and bottom air inlets of the five air ducts are all correspondingly connected with the air distribution system. The air outlet of the first air duct is connected with a first air nozzle positioned at the bottom of the inner cavity of the gasification combustion chamber, and the air outlet of the first air nozzle faces upwards. The air outlet of the second air duct is communicated with the lower part of the inner cavity of the gasification combustion chamber. The air outlet of the third air duct is communicated with the upper part of the inner cavity of the gasification combustion chamber and the lower part of the feeding door; The air outlet of the fourth air duct is connected with a second air nozzle positioned at the top of the inner cavity of the gasification combustion chamber, and the air outlet of the second air nozzle faces downwards. The air outlet of the fifth air duct is communicated with the air inlet of the outer sleeve.

By adopting the technical scheme, the invention has the advantages of full and thorough fuel combustion, high combustion effect, low nitrogen oxide emission, low particulate matter content in smoke, no dust removal equipment, no deflagration phenomenon of combustible gas in the gasification combustion chamber, safe operation of the boiler and high thermal effect.

Preferably, the inner cavities of the wall surfaces of the gasification combustion chamber and the gas combustion chamber are filled with high-temperature refractory concrete, and the five air ducts are embedded in the high-temperature refractory concrete of the gasification combustion chamber.

Preferably, the top of the inner cavity of the gasification combustion chamber is in a frustum shape, and a middle outlet at the top of the frustum shape inner cavity is connected with, the air outlet.

Preferably, the bottom of the inner cavity of the gasification combustion chamber is a fixed bed, and the fixed bed is provided with the downward port; The tuyere is also installed on the fixed bed.

Preferably, the middle position below the inner cavity of the gas combustion chamber is provided with a groove-shaped high-temperature combustion chamber which is made of high-temperature refractory concrete and has an opening at one end. The bottom of the high-temperature combustion chamber is communicated with the upper end of the inner sleeve, and the open end of the side surface faces the sealing door of the gas combustion chamber.

Preferably, the heat exchanger comprises a first smoke chamber, a first smoke pipe, a smoke turning chamber, a second smoke pipe, the second smoke chamber and a smoke outlet, wherein the first smoke chamber and the second smoke chamber are horizontally arranged side by side and are communicated with the smoke outlet; The upper end of the first smoke pipe is communicated with the bottom end of the first smoke chamber, and the lower end is communicated with one side of the top of the smoke turning chamber; the other side of the top of the smoke turning chamber is communicated with the lower end of a second smoke pipe, and the upper end of a second smoke pipe is connected with the second smoke chamber.

Preferably, the air distribution system comprises a high-pressure frequency conversion air pump, an air box and an electromagnetic valve, wherein the high-pressure frequency conversion air pump is communicated with an air box air inlet of the air box, and five air box air outlets of the air box are respectively connected with bottom air inlets of five air ducts through corresponding ventilation pipelines; And the five electromagnetic valves are respectively arranged on the five corresponding ventilation pipelines.

Preferably, temperature sensors are arranged in the gasification combustion chamber and the gas combustion chamber, and the temperature sensors are electrically connected with the electromagnetic valves.

Preferably, the temperature in the gasification combustion chamber is 600 to 800° C.

Preferably, the temperature in the gas combustion chamber is 900 to 1100° C.

Preferably, an automatic feeding device is connected outside the feeding door.

Due to the adoption of the technical scheme, the invention has the following beneficial effects compared, with the prior art:

1. Because the combustible gas in the gasification combustion chamber is always in an open fire combustion state, the deflagration phenomenon of the combustible gas in the gasification boiler can be avoided, and the safe operation, of the gasification boiler is ensured;
2. The fuel in the gasification combustion chamber is pyrolyzed and combusted under the condition of low temperature and oxygen deficiency, the temperature in the gasification combustion chamber is controlled below 800° C., and the generated NOx content is low, thereby reducing the emission of NOx;
3. The fuel layer in the gasification combustion chamber is combusted from top to bottom, and the ash fixed carbon on the fuel layer is subjected to multiple pyrolysis combustion, so that the fixed carbon in the ash is completely combusted, the fuel is completely combusted, the combustion efficiency is improved, and the use amount of the fuel is saved;
4. The combustion area moves downwards to generate heat to separate out combustible gas, so that the flying dust generated in the gasification combustion chamber is extremely little, the emission of particles in the smoke is low, dust removal equipment is saved, the investment is saved, and the requirement of environmental protection is met;
5. The heat exchanger is adopted, the convection heating surface is increased, the heat can be fully absorbed, the exhaust gas temperature of the gasification boiler is reduced, and the thermal efficiency of the gasification boiler is improved.
6. An automatic feeding device and a twisting cage slag remover are added, so that automatic feeding and slag removal can be realized, and the labor intensity of workers is reduced.

BRIEF DESCRIPTION OF DRAWINGS

In order to more clearly illustrate the embodiments of the disclosure or the technical solutions in the prior art, the following is a brief introduction to the drawings used in the description of the embodiments or the prior art. Obviously, the drawings in the following description are only embodiments of the disclosure. For those of ordinary skill in the art, other figures may also be derived from the figures provided.

Figure 1:
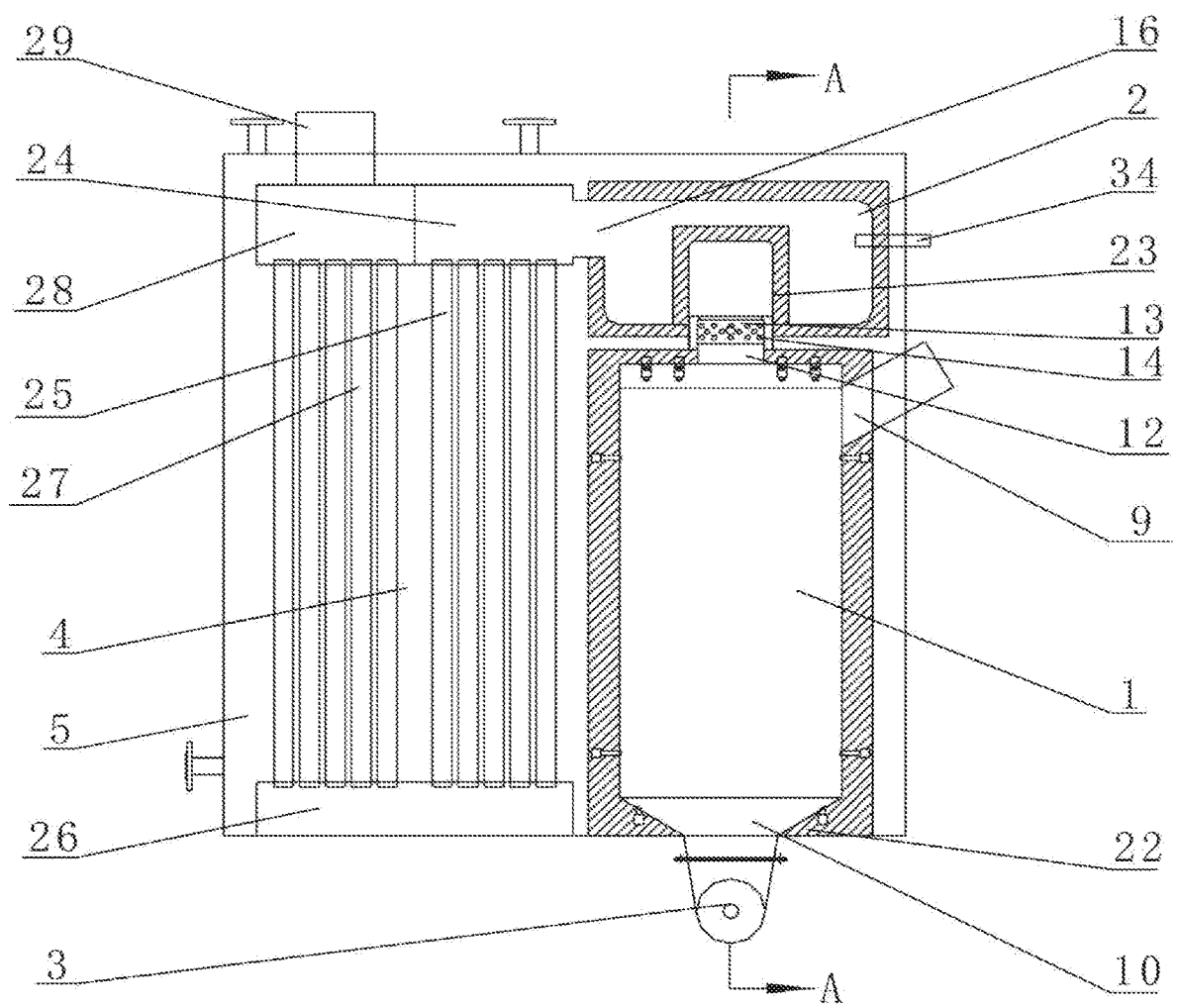
FIG. 1 is a main sectional view of a boiler according to the disclosure.

In the drawings: gasification combustion chamber 1, gas combustion chamber 2, stranding cage slag remover 3, heat exchanger 4, water jacket 5, air duct 6, air distribution system 7, gasification combustion chamber sealing door 8, feeding door 9, port 10, sealing door of slag removal port 11, gas outlet 12, air chamber 13, air outlet 14, gas combustion chamber sealing door 15, smoke vent 16, first air duct 17, second air duct 18, third air duct 19, fourth air duct 20, fifth, air duct 21, fixed bed 22, high temperature, combustion chamber 23, first smoke chamber 24, first smoke tube 25, smoke turning chamber 26, second smoke tube 27, second smoke chamber 28, smoke outlet 29, high pressure frequency conversion air pump 30, air box 31 solenoid Valve 32, vent line 33 temperature sensor 34.

DETAILED DESCRIPTION OF THE EMBODIMENTS

Embodiments of the disclosure are described in detail below, examples of which are illustrated in the accompanying drawings, wherein the same or similar reference numerals indicate the same or similar elements or elements having the same or a similar function throughout. The embodiments described below by way of example with reference to the accompanying drawings are intended to explain the invention and are not to be construed as a limiting of the invention.

In the description of the disclosure, it should be understood that the orientation or positional relationship indicated by the terms "upper", "lower", "front" and "rear", "left" and "right", vertical "and horizontal", and "top" or "bottom" as well as "inner" or "outer" is based on the orientation, or positional relationship shown in the drawings, which is only for convenience of description of the disclosure and simplification of description, it is not intended to indicate or imply that the devices or elements referred to must have a particular orientation, be constructed and operate in a particular orientation, and therefore, should not be construed as limiting the invention.

Furthermore, the terms "first" and "second" are used for descriptive purposes only and are not to be construed as indicating or implying relative importance or as implying the number of technical features indicated. Thus, the features defined as "first" or "second" may be explicitly or implicitly defined as including one or more of the features. In the description of the disclosure, "a plurality" means two or more unless specifically defined otherwise.

EXAMPLES

Figure 2:
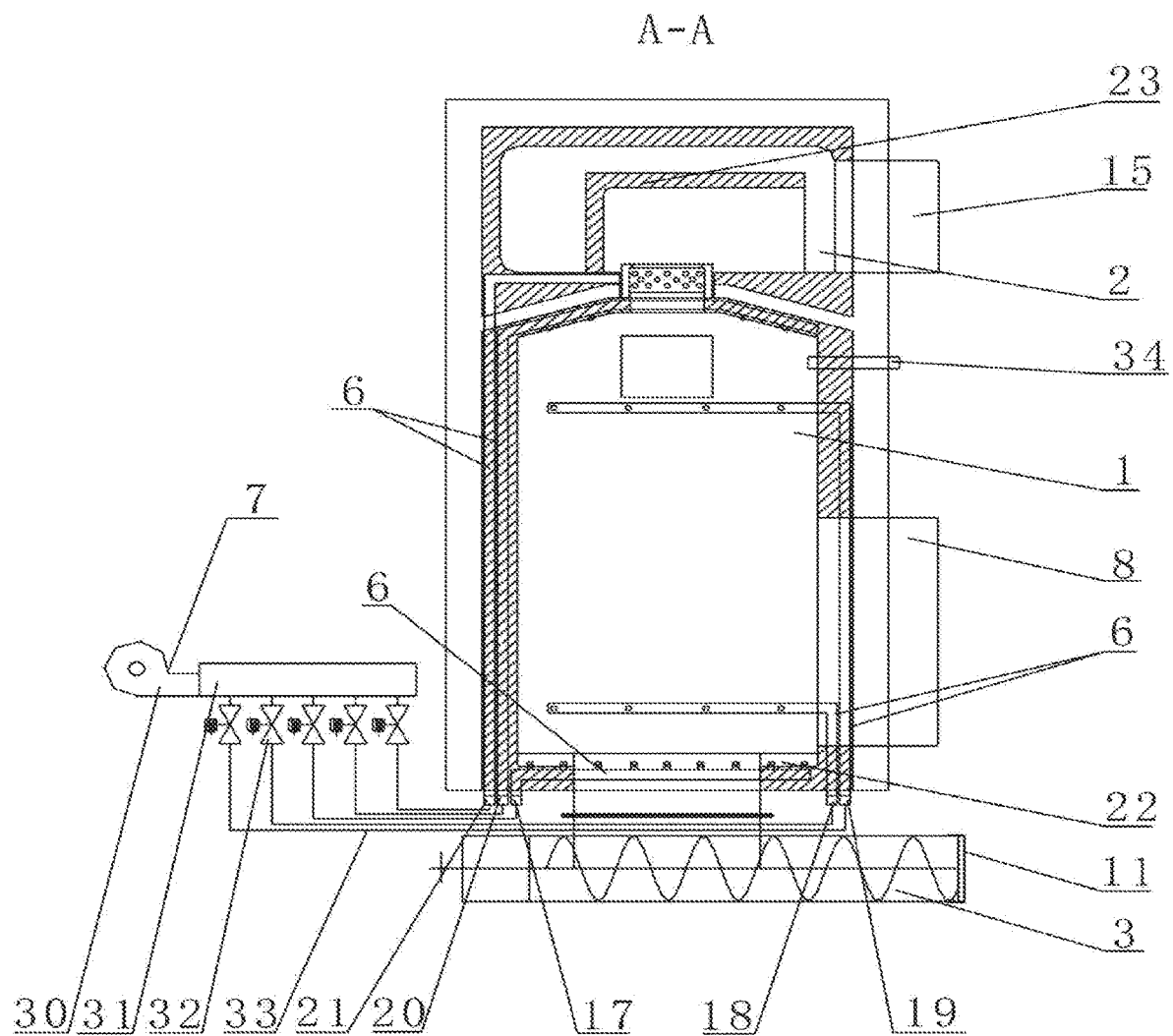
FIG. 2 is a cross-sectional view taken along line A-A of FIG. 1.

As shown in FIG. 1 and FIG. 2, the downward mobile gasification boiler for surface gas-phase combustion and pyrolysis of biomass briquette of the disclosure includes a gasification combustion chamber 1, a gas combustion chamber 2, a stranding cage slag remover 3, a heat exchanger 4, a water jacket 5, an air duct 6 and an air distribution system 7.

The gasification combustion chamber 1 is provided with a gasification combustion chamber sealing door 8 on the lower side and a feeding door 9 on the upper side. The gasification combustion chamber sealing door 8 and the feeding door 9 are located on different sides of the gasification combustion chamber 1. The feeding door 9 is used for feeding fuel into the gasification combustion chamber 1 and igniting, and can be directly externally connected with an automatic feeding device.

A fixed bed 22 is arranged at the bottom of the inner cavity of the gasification combustion chamber 1. The fixed bed 22 is provided with a downward port 10, the bottom end of the port 10 is connected with an inlet of a stranding cage slag remover 3 positioned at the lower part of the gasification combustion chamber 1. A slag removing port of the stranding cage slag remover 3 is communicated with the outside of a boiler, and a slag removing port sealing door 11 is arranged at the slag removing port. Slag on the fixed bed 22 of the gasification combustion chamber 1 enters the stranding cage slag remover 3 through the port 10 on the fixed bed 22, and is discharged out of the furnace through the slag removing port of the stranding cage slag remover 3. The sealing door 11 of the slag removing port is used to cover the slag removing port after slag removal is finished to prevent gas leakage in the gasification combustion chamber 1.

The top of the inner cavity of the gasification combustion chamber 1 is in a frustum shape, which is convenient for the collection of smoke and combustible gas. The middle outlet at the top of the frustum-shaped inner cavity is connected with the gas outlet 12, and the collected smoke and combustible gas enter the gas combustion chamber 2 through the gas outlet 12.

The upper end of the gas outlet 12 is communicated with an air chamber 13. The air chamber 13 includes an outer sleeve and an inner sleeve. The outer sleeve is provided with an outer sleeve air inlet connected with a fifth air duct 21, and the side peripheral wall of the inner sleeve is uniformly provided with a number of air outlets 14. The upper end of the inner sleeve is communicated with a gas combustion chamber 2 positioned at the upper part of the gasification combustion chamber 1. The air entering the air chamber 13 is heated, and the oxygen in the air coming out from the number of air outlets 14 on the inner sleeve of the air chamber 13 fully mixes the smoke coming out from the gas outlet 12 with the combustible gas, which is helpful for the burnout of the combustible gas.

A gas combustion chamber sealing door 15 is mounted on the side of the gas combustion chamber 2, and the gas combustion chamber sealing door 15 is located on the same side as the gasification combustion chamber seal doors 8. The gasification combustion chamber sealing door 8 and the gas combustion chamber sealing door 15 are used for workers to inspect, maintain and clean the corresponding combustion chambers inside the boiler.

Furthermore, the middle position below the inner cavity of the gas combustion chamber 2 is also provided with a groove-shaped high-temperature combustion chamber 23 which is made of high-temperature refractory concrete and has an open end. The bottom of the high-temperature combustion chamber 23 is communicated with the upper end of the inner sleeve. The side opening end faces the sealing door 15 of the gas combustion chamber, and the smoke in the high-temperature combustion chamber 23 enters the gas combustion chamber 2 through the side opening end. The high temperature combustion chamber 23 is used to heat the combustible gas and the gasified tar from the gasification combustion chamber 1, so that the heated combustible gas and the gasified tar burn out.

The heat exchanger 4 is integrally arranged at the side of the gasification combustion chamber 1 and the gas combustion chamber 2, the side is opposite to the side where the feeding door 9 is located. The side of the gas combustion chamber 2 close to the heat exchanger 4 is communicated with the heat exchanger through a smoke vent 16, and the smoke generated by the combustion of the smoke and combustible gas in the gas chamber 2 is discharged from the smoke vent 16 into the flue of the heat exchange unit 4.

Specifically, the heat exchanger 4 includes a first smoke chamber 24, a first smoke pipe 25, a smoke turning chamber 26, a second smoke pipe 27, a second smoke chamber 28, and a smoke outlet 29. The first smoke chamber 24 and the second smoke chamber 28 are horizontally arranged side by side, and the first smoke chambers 24 are communicated with the smoke vent 16. The upper end of the first smoke pipe 25 is communicated with the bottom end of the first smoke chamber 24, the lower end is communicated with one side of the top of the smoke turning chamber 26. The other side of the top of the smoke turning chamber 26 is communicated with the lower end of a second smoke pipe 27. The upper end of a second smoke pipe 27 is connected with a second smoke chamber 28, and a smoke outlet 29 is arranged at the top end of said second smoke chamber 28. The high temperature smoke of the gas combustion chamber 2 is discharged from the smoke outlet 29 after convection heat exchange through the smoke vent 16, the first smoke chamber 24, the first smoke pipe 25, the smoke turning chamber 26, the second smoke pipe 27 and the second smoke chamber 28.

The periphery of the gasification combustion chamber 1, the gas combustion chamber 2 and the heat exchanger 4 is integrally provided with a water jacket 5. The water jacket 5 absorbs the radiation heat of the gasification combustion chamber 1 and the gas combustion chamber 2 and the convection heat of the heat exchanger 4, and the water jacket absorbs the heat for a user to use through an outer net.

The inner cavities of the wall surfaces of the gasification combustion chamber 1 and the gas combustion chamber 2 are filled with high-temperature refractory concrete, which is used for reducing the water cooling degree of the corresponding combustion chamber, increasing the radiation heat and improving the temperature of the combustion chamber.

Simultaneously, five air ducts 6 are arranged in the high-temperature refractory concrete of the cavity of the wall surface of the gasification combustion chamber 1, namely a first air duct 17, a second air duct 18, a third air duct 19, a fourth air duct 20 and a fifth air duct 21. The air ducts 6 are arranged at the two side, the top end and the bottom of a sealing door 8 of the gasification combustion chamber. The vaporization combustion chamber 1 heats the air in the air ducts 6 contribute to the combustion of combustible gases.

Specifically, the bottom air inlets of the five air ducts are all correspondingly connected with the air distribution system 7. An air outlet of the first air duct 17 is connected with a first air nozzle on the fixed bed 22 at the bottom of the inner cavity of the gasification combustion chamber 1, and an air outlet of the first air nozzle faces upward. The air outlet of the second air duct 18 is communicated with the lower part of the inner cavity of the gasification combustion chamber 1. The air outlet of the third air duct 19 is communicated with the upper part of the inner cavity of the gasification combustion chamber 1 and the lower part of the feeding door 9. The air outlet of the fourth air duct 20 is connected with the second air nozzle located at the top of the inner cavity of the gasification combustion chamber 1, and the air outlet of the second air nozzle faces downward. The air outlet of the fifth air duct 21 is communicated with the air inlet of the outer sleeve.

The air distribution system 7 includes a high-pressure frequency conversion air pump 30, an air box 31 and an electromagnetic valve 32. The high-pressure frequency conversion air pump 30 is communicated with an air box inlet of the air box 31, and five air box outlets of the air box 31 are respectively connected with bottom air inlets of five air ducts through corresponding ventilation pipelines 33. Five electromagnetic valves 32 in total are provided, which are respectively installed on the corresponding five vent pipelines 33.

The bottom air inlet of the first air duct 17 is correspondingly supplied with primary air, the bottom air inlet of the second air duct 18 is correspondingly supplied with secondary air. The bottom air inlets of the third air ducts 19 are correspondingly supplied with tertiary air. The bottom air inlets of the fourth air ducts 20 are respectively supplied with quantic air, and bottom air outlets of the fifth air ducts 21 are respectively supplied with quantic air. The different secondary air is controlled by means of the corresponding different solenoid valves 32.

Further, both the gasification combustion chamber 1 and the gas combustion chamber 2 are provided with a temperature sensor 34, and the temperature sensor 34 is electrically connected to each electromagnetic valve 32.

The high-pressure variable-frequency air pump 30 supplies air to the five corresponding air ducts 6 through each electromagnetic valve 32, and adjusts the opening degree of the electromagnetic valve 32 in time according to the temperature sensed by the temperature sensor 34 of the gasification combustion chamber 1 and the gas combustion chamber 2 to ensure stable combustion. The temperature in the gasification combustion chamber 1 is 600-800° C., and the air temperature in the gas combustion chamber 2 is 900-1100° C.

The specific working principle of the invention is as follows:

The feeding door 9 on the side wall of the gasification combustion chamber 1 is opened, fuel is fed into the gasification combustion chamber 1 from the feeding door 9 by an automatic feeding machine, and the feeding is stopped when the fuel is fed to a position below the feeding door 9. Ignition is performed at the feeding door 9, after the upper part of the fuel layer is ignited and combusted, and the feeding door 9 is closed, the electromagnetic valves 32 corresponding to the primary air is opened. The tertiary air and the quaternary air, at the initial stage of combustion, the upper fuel generates oxidation reaction (there is an open fire stage at the upper part of the fuel layer), the heat and the combustion area move downward, and pyrolysis is generated to separate out combustible gas. Oxygen moves to the top through the fuel bed, resulting in insufficient oxygen at the top of the fuel, so the fuel at the top cannot be fully burned, and gradually the biomass in the top area is converted into biomass charcoal (there is no open fire in the top fuel layer), but the temperature at the lower part can still maintain pyrolysis, while the tar, carbon dioxide and water vapor after pyrolysis are cracked into combustible gas again after passing through the biomass charcoal layer on the top. After the tertiary air and the quaternary air are mixed with oxygen, the tar and the combustible gas are burnt again at the top of the gasification combustion chamber 1, the unburnt combustible gas enters the high-temperature combustion chamber 23 in the gas combustion chamber 2 through the gas outlet 12 at the top of the gasification combustion chamber 1, and an electromagnetic valve 32 corresponding to the fifth air is opened. Since an air chamber 13 is arranged on the gas outlet 12, the fifth air passes through the air outlet hole 14 on the inner sleeve of the air chamber 13 to provide sufficient oxygen to the combustible gas passing through the gas outlet 12, so that the combustible gas and the oxygen are fully mixed and enter the high-temperature combustion chamber 23 and the gas combustion chamber 2. The combustible gas is fully combusted and burned out, and the generated smoke enters the heat exchanger 4 through the smoke vent 16. The smoke entering the heat exchanger 4 is returned twice, so that the residence time of the smoke in the heat exchanger 4 is increased, the heat of the smoke after heat exchange is transferred to the water in the water jacket 5 for a user to use, and the smoke dust particles in the smoke fall into a smoke turning chamber 26 under the action of gravity during returning, so that the dust removal effect is improved.

In the combustion process, with the downward movement of the pyrolysis surface, when burning to the bottom, open the electromagnetic valve 32 corresponding to the secondary air, so that the fuel in the entire fuel bed burns out. The burned ash enters the stranding cage slag remover 3 through the port 10 in the fixed bed 22. The slag removal port seal door 11 on the slag removal port of the stranding cage slag remover 3 is opened, and the stranding basket slag remover is started to remove slag. When the ash and slag in the gasification combustion chamber 1 are discharged to be flush with the lower plane of the fixed bed 22, slag removal is stopped, and then the sealing door 11 of the slag removal port of the stranding cage slag remover 3 is closed. At this time, materials can continue to be fed into the boiler and circulate in turn.

In this specification, each embodiment is described in a progressive manner, and each embodiment focuses on the differences from other embodiments, and the same and similar parts of each embodiment can be referred to each other. For the device disclosed in the embodiment, since it corresponds to the method disclosed in the embodiment, the description is relatively simple, and related parts can be described in the method part.

The above description of the disclosed embodiments will enable any person skilled in the art to make or use the invention. Various modifications to these embodiments will be readily apparent to those skilled in the art, and the generic principles defined herein may be implemented in other embodiments without departing from the spirit or scope of the invention. Thus, the disclosure is not intended to be limited to the embodiments shown herein but is to be accorded the widest scope consistent, with the principles and novel features disclosed herein.

What is claimed is:

1. A downward mobile gasification boiler for surface gas-phase combustion and pyrolysis of biomass briquette, comprising:
    a gasification combustion chamber,
    a fuel gas combustion chamber,
    a stranding cage slag remover,
    a heat exchanger, a water jacket,
    an air duct and an air distribution system;
    wherein a lower side surface of the gasification combustion chamber is provided with a gasification combustion chamber sealing door; an upper side surface of the gasification combustion chamber is provided with a sealed feeding door; the gasification combustion chamber sealing door and the sealed feeding door are positioned on different sides of the gasification combustion chamber; a bottom of the inner cavity of the gasification combustion chamber is provided with a downward through opening; a bottom end of the through opening is connected with an inlet of the stranding cage slag remover positioned at the lower part of the gasification combustion chamber; a slag removing port of the stranding cage slag remover is communicated with the outside of a boiler, and a sealing door of a slag removing port is arranged at the slag removing port; a top of an inner cavity of the gasification combustion chamber is connected with an air outlet, the upper end of the air outlet is communicated with an air chamber which consists of an outer sleeve and an inner sleeve, the outer sleeve is provided with an outer sleeve air inlet, and the side peripheral wall of the inner sleeve is uniformly provided with a plurality of air outlets; the upper end of the inner sleeve is communicated with the gas combustion chamber positioned at the upper part of the gasification combustion chamber; the side surface of the gas combustion chamber is provided with a gas combustion chamber sealing door, and in addition, the sealing door of the gas combustor and the sealing door of the gasification combustion chamber are positioned at the same side; the heat exchanger is integrally arranged on the sides of the gasification combustion chamber and the gas combustion chamber, and one side of the gas combustion chamber close to the heat exchanger is communicated with the heat exchanger through a smoke outlet; the periphery of the gasification combustion chamber, the gas combustion chamber and the heat exchanger is integrally provided with the water jacket, and the water jacket is communicated with an outer net; the inner cavity of the wall surface of the gasification combustion chamber is internally provided with five air ducts which are a first air duct, a second air duct, a third air duct, a fourth air duct and a fifth air duct respectively; bottom air inlets of the five air ducts are all correspondingly connected with the air distribution system; the air outlet of the first air duct is connected with a first air nozzle positioned at the bottom of the inner cavity of the gasification combustion chamber, and the air outlet of the first air nozzle faces upwards; the air outlet of the second air duct is communicated with the lower part of the inner cavity of the gasification combustion chamber; the air outlet of the third air duct is communicated with the upper part of the inner cavity of the gasification combustion chamber and the lower part of the feeding door; the air outlet of the fourth air duct is connected with a second air nozzle positioned at the top of the inner cavity of the gasification combustion chamber, and the air outlet of the second air nozzle faces downwards; the air outlet of the fifth air duct is communicated with the air inlet of the outer sleeve.

2. The downward mobile gasification boiler with surface gas-phase combustion and pyrolysis of biomass briquette of claim 1, wherein the inner cavities of the wall surfaces of the gasification combustion chamber and the gas combustion chamber are filled with high-temperature refractory concrete, and the five air ducts are embedded in the high-temperature refractory concrete of the gasification combustion chamber.

3. The downward mobile gasification boiler for surface gas-phase combustion and pyrolysis of biomass briquette of claim 1, wherein the top of the inner cavity of the gasification combustion chamber is in a frustum shape, and the middle outlet at the top of the frustum shape inner cavity is connected with the air outlet.

4. The downward mobile gasification boiler for surface gas-phase combustion and pyrolysis of biomass briquette of claim 1, wherein the bottom of the inner cavity of the gasification combustion chamber is a fixed bed, and the fixed bed is provided with the downward through hole; and the tuyere is also arranged on the fixed bed.

5. The downward mobile gasification boiler for surface gas-phase combustion and pyrolysis of biomass briquette of claim 1, wherein a groove-shaped high-temperature combustion chamber with an open end made of high-temperature refractory concrete is arranged at the middle position below the inner cavity of the gas combustion chamber; the bottom of the high-temperature combustion chamber is communicated with the upper end of the inner sleeve, and the open end of the side surface faces the sealing door of the gas combustion chamber.

6. The downward mobile gasification boiler for surface gas-phase combustion and pyrolysis of biomass briquette of claim 1, wherein the heat exchanger comprises a first smoke chamber, a first smoke pipe, a smoke turning chamber, a second smoke pipe, the second smoke chamber and a smoke outlet;
    wherein the first smoke chamber and the second smoke chamber are horizontally arranged side by side and are communicated with the smoke outlet; the upper end of the first smoke pipe is communicated with the bottom end of the first smoke chamber, and the lower end is communicated with one side of the top of the smoke turning chamber; the other side of the top of the smoke turning chamber is communicated with the lower end of a second smoke pipe, and the upper end of a second smoke pipe is connected with the second smoke chamber.

7. The downward mobile gasification boiler for surface gas-phase combustion and pyrolysis of biomass briquette of claim 1, wherein the air distribution system comprises a high-pressure variable-frequency air pump, an air box and an electromagnetic valve; the high-pressure variable-frequency air pump is communicated with an air inlet of the air box; the five air box outlets of the air box are respectively connected with the bottom air inlets of the five air ducts through corresponding ventilation pipelines; and the five electromagnetic valves are respectively arranged on the five corresponding ventilation pipelines.

8. The downward mobile gasification boiler for surface gas-phase combustion and pyrolysis of biomass briquette of claim 7, wherein the gasification combustion chamber and the gas combustion chamber are both provided with temperature sensors, and the temperature sensors are electrically connected with the electromagnetic valves.

9. The downward mobile gasification boiler for surface gas-phase combustion and pyrolysis of biomass briquettes of claim 1, wherein the temperature in the gasification combustion chamber is 600 to 800° C.

10. The downward mobile gasification boiler for surface gas-phase combustion and pyrolysis of biomass briquette of claim 9, wherein the temperature in the gas combustion chamber is 900 to 1100° C.

* * * * *